United States Patent
Dai et al.

(10) Patent No.: US 7,141,892 B2
(45) Date of Patent: Nov. 28, 2006

(54) POWER SUPPLY METHOD OF A LINE INTERACTIVE UPS AND THE LINE INTERACTIVE UPS

(75) Inventors: Guo-Feng Dai, Shenzhen (CN); Norman Day, Tainan Hsien (TW)

(73) Assignee: Phoenixtec Power Co., Ltd., Taipei (TW)

( * ) Notice: Subject to any disclaimer, the term of this patent is extended or adjusted under 35 U.S.C. 154(b) by 531 days.

(21) Appl. No.: 10/223,213

(22) Filed: Aug. 20, 2002

(65) Prior Publication Data
US 2004/0036361 A1    Feb. 26, 2004

(51) Int. Cl.
*H02J 7/00* (2006.01)
(52) U.S. Cl. .............................. 307/64; 307/45; 307/44; 307/64; 307/43; 307/70; 307/80; 307/87; 307/42; 323/259
(58) Field of Classification Search .................. 307/46, 307/45, 44, 64, 43, 70, 80, 87, 42; 323/259
See application file for complete search history.

(56) References Cited

U.S. PATENT DOCUMENTS

| | | | | |
|---|---|---|---|---|
| 4,763,013 A | * | 8/1988 | Gvoth, Jr. et al. | 307/66 |
| 5,329,222 A | * | 7/1994 | Gyugyi et al. | 323/207 |
| 5,612,580 A | * | 3/1997 | Janonis et al. | 307/64 |
| 6,201,371 B1 | * | 3/2001 | Kawabe et al. | 320/121 |
| 2002/0011752 A1 | * | 1/2002 | Powell et al. | 307/64 |
| 2002/0153779 A1 | * | 10/2002 | Wade et al. | 307/66 |

* cited by examiner

*Primary Examiner*—Robert L. Deberadinis
*Assistant Examiner*—Daniel Cavallari
(74) *Attorney, Agent, or Firm*—Bacon & Thomas

(57) ABSTRACT

A power supply method and apparatus of a line interactive UPS utilizes a bi-directional AC/AC power converter in association with the AC delta control concept. When the line voltage coupled to the AC/AC power convert exceeds high/low statuses, the UPS is operated in a line voltage conversion mode, wherein the AC/AC power converter supplies a voltage to compensated the line voltage based on the stability of the line voltage, and then the compensated stable voltage is further provided to the load so as to perform the voltage boost (step-up) and/or voltage buck (step-down).

18 Claims, 16 Drawing Sheets

POWER SUPPLY METHOD OF A LINE INTERACTIVE UPS AND THE LINE INTERACTIVE UPS

BACKGROUND OF THE INVENTION

1. Field of Invention

The present invention relates to a power supply method of a line interactive uninterruptible power supply (UPS), and more particularly to a line interactive UPS that employs a bi-directional AC/AC power converter in association with the AC delta control theory to perform the voltage boost/buck conversion.

2. Related Art

The early uninterruptible power supply (UPS) devices mainly include two types, the on-line type UPS and the off-line type UPS. In recent years, a new kind of UPS, the line interactive type, is developed and possesses both the features of the on-line and off-line types. The three kinds of UPS devices are briefly discussed hereinafter.

1. On-line UPS: When the line voltage (local voltage) is normal, the line voltage input to the UPS through a filtering circuit and a noise absorbing circuit will charge a battery set through a charging circuit and input into an inverter through a rectifying circuit simultaneously. After the line voltage is rectified and converted by the inverter, the stable power with superior quality is further provided to electrical instruments, such as a computer or its any peripheral products. Otherwise, when the line voltage is abnormal, the power for those electrical instruments is provided by the charged battery set.

2. Off-line UPS: The line voltage is directly provided to a load without needing to be processed by the UPS when the line voltage is normal. Meanwhile, the line voltage is input through a charging circuit to charge a battery set. When the line voltage is unstable or interrupted, a switch provide inside the UPS switches the power supply path from line voltage to the battery set, whereby the load still can obtain power through the charged battery.

3. Line interactive UPS: Basically, a line interactive UPS is similar to the off-line UPS mentioned foregoing. The difference is that the line interactive UPS will convert the line voltage under a boost (step-up) mode or a buck (step-down) mode, when the line voltage is higher or lower than a normal and still in a predetermined tolerable range. Therefore, the converted voltage is able to provide to the load, and the UPS system does not need to operate in a battery power supply mode.

Usually, the line interactive UPS is equipped with an automatic voltage regulation transformer (AVR TX) therein. When the line voltage coupled to the input of the AVR TX is abnormal, the AVR TX automatically and appropriately switches to one of multiple output taps based on the voltage level of the line voltage. After the line voltage is transformed into a normal level via the AVR TX, the transformed line voltage is output through the appropriate output tap to the load. Since the load is still powered by the line voltage not the battery set, the discharge times of the battery set is accordingly reduced to prolong the use life of the battery set. However, the drawbacks of the line interactive UPS are:

(1) The AVR TX occupies a huge space because of its large size.

(2) The output voltage of the AVR TX is determined by multi-stage control means, i.e. the output voltage is output via one of the multiple output taps. Therefore, it is difficult to precisely determine the output voltage level.

(3) The voltage transforming efficiency of the AVR TX is quite low.

(4) If the tolerable adjust ranger for the abnormal line voltage is intended to widen, the AVR TX must designed with more input taps and output taps. Thus, the complexity of the AVR TX design is raised and the production cost for the entire UPS is accordingly increased.

To overcome the shortcomings, a power supply method of a line interactive UPS and the UPS device in accordance with the present invention obviates or mitigates the aforementioned drawbacks.

SUMMARY OF THE INVENTION

The primary objective of the present invention is to provide a power supply method of a line interactive UPS and the UPS device, wherein the UPS device utilizes a high frequency bi-directional AC/AC power converter to replace an AVR TX, wherein the AC/AC power converter is provided to step-up (boost) or step-down (buck) the line voltage so as to provide the load with a stable power.

To achieve the objective of the present invention, the power supply method of a line interactive UPS first determines an operating mode from a by-pass mode, a line voltage conversion mode and a battery mode, based on the stability of a line voltage. When in the line voltage conversion mode, the voltage level of the line voltage is further compared with a predetermined value, if the line voltage is higher than the predetermined value, a compensation voltage with a phase that is reverse to that of the line voltage is applied to the line voltage, otherwise if the line voltage is lower than the predetermined value, a compensation voltage with a phase that is the same with that of the line voltage is applied to the line voltage.

The apparatus of the present invention comprises:

a bi-directional AC/AC converter coupled to a line voltage through a first switching unit, wherein two output terminals of the first switching unit are respectively linked to a second switching unit and a third switching unit;

wherein the AC/AC converter with two input terminals respectively connected to the two output terminals of the first switching unit, and an output terminal of the AC/AC converter is selectively coupled to one of the second and the third switching units;

wherein a load is provided between the second switching unit and the third switching unit;

wherein when the line voltage is unstable, the AC/AC converter outputs a compensation voltage with a phase that is reversed to or is the same with a phase of the line voltage, and the line voltage with the compensation voltage is applied to the load.

Other objectives, advantages and novel features of the invention will become more apparent from the following detailed description when taken in conjunction with the accompanying drawings.

DETAILED DESCRIPTION OF THE INVENTION

A power supply method of a line interactive UPS and the UPS device are disclosed in the present invention. When the line interactive UPS is operated in a line voltage conversion mode, i.e. when the line voltage is unstable, the AC delta control concept is introduced to perform the voltage boost (voltage step-up) or voltage buck (voltage step-down). The AC delta control concept is that if two AC voltages have the same frequency, the root mean square value (Vrms) of one AC voltage is able to be added or to subtracted that of the other AC voltage.

For example, if two root mean square values of the two AC voltages respectively represented with A and $\Delta A$ are intended to be added to or subtracted from each other, the calculation formula is $A \sin x + A \sin(x+\omega) = B \sin x$, where symbol "$\omega$" is the phase difference between the two AC voltages, and B is a root mean square value.

If there is no phase difference. i.e.$\omega=0$, the two AC voltages are added to each other and thus B is equal to $A+\Delta A$.

Otherwise, if the phase difference $\omega$ is equal to $\pi$, the two AC voltages are subtracted from each other and thus B is equal to $A-\Delta A$.

When the AC delta control concept is introduced in the present invention, the input line voltage to the UPS is deemed as $A \sin x$, and the output voltage of an AC/AC power converter is deemed as $\Delta A \sin(x+\omega)$. Thus the summation of both, which is deemed as $B \sin x$, is the output voltage of the UPS and further supplied to a load.

In a predetermined tolerable range of the line voltage, since the output voltage ($B \sin x$) is known, the difference value between the output voltage ($B \sin x$) and the line voltage ($A \sin x$) can be calculated by the use of foregoing formula. The phase of the difference value $\Delta A \sin(x+\omega)$, i.e. the output voltage of the AC/AC converter, is further determined to be reverse to or the same as that of the line voltage ($A \sin x$).

Figure 1:
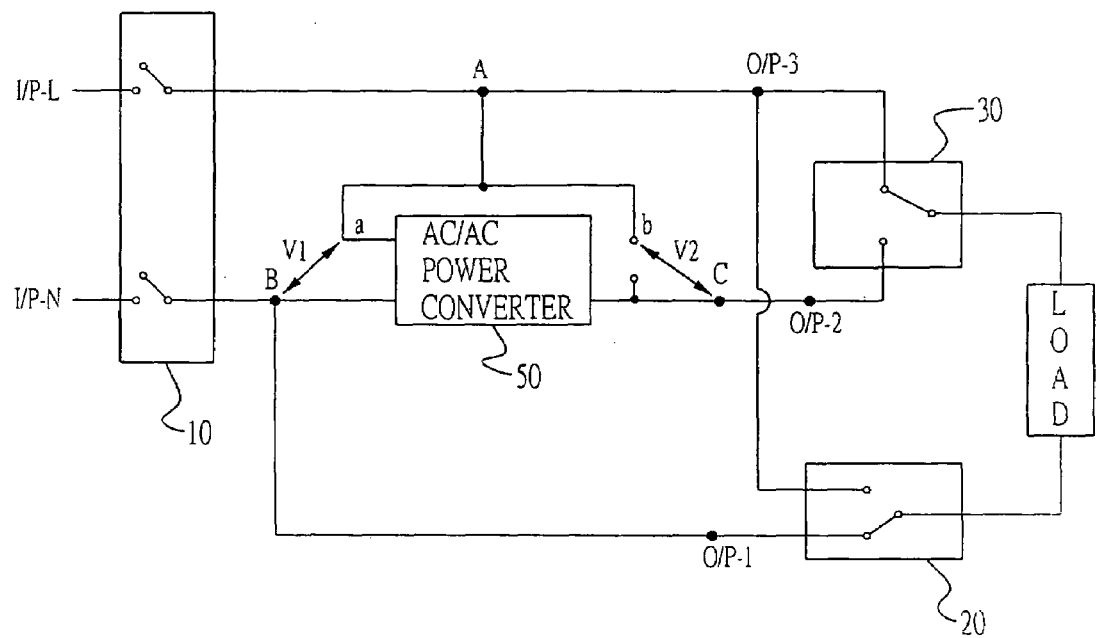
FIG. 1 is a block diagram of a first embodiment of a line interactive UPS in accordance with the present invention.

With reference to FIG. 1, a block diagram of a first embodiment in accordance with the present invention comprises a first switching unit (10), a bi-directional AC/AC power converter (50), a switching means and a load. In this embodiment, the switching means is composed of a second switching unit (20) and a third switching unit (30), wherein the load is coupled between the second switching unit (20) and the third switching unit (30).

The line voltage is coupled via two lines (I/P-L, I/P-N) and through the first switching unit (10) to the AC/AC power converter (50). Two output terminals of the first switching unit (10) are respectively linked to the second switching unit (20) and the third switching unit (30), wherein the two terminals are used as a first output terminal (O/P-1) and a third output terminal (O/P-3) that is further linked to the second switching unit (20).

After the line voltage is converted by the AC/AC converter (50), the output voltage of the AC/AC converter (50) is output via a second output terminal (O/P-2), wherein the output voltage value of the AC/AC converter (50) from second output terminal (O/P-2) is relative to the third output terminal (O/P-3).

The three output terminals (O/P-1)–(O/P-3) are appropriately switched to provide a stable voltage to the load based on the operation modes of the UPS. The operation modes of the UPS include a by-pass mode, a line voltage conversion mode and a battery mode.

1. Bypass mode: When the input line voltage is stable, the line voltage is directly provided to the load without any conversion by the AC/AC converter (50). The second switching unit (20) is switched to link with the first output terminal (O/P-1), and the third switching unit (30) is switched to link with the third output terminal (O/P-3). Therefore the line voltage can directly provided to the load.

2. Line voltage conversion mode: When the input line voltage exceeds high/load but is still in the predetermined tolerable range, the second switching unit (20) is switched to link with the first output terminal (O/P-1), and the third switching unit (30) is switched to link with the second output terminal (O/P-2). Thus the AC/AC power converter (50) is able to provide a compensation voltage to be coupled to the line voltage in series so as to perform the voltage boost mode and voltage buck mode.

3. Battery mode: When the line voltage is abnormal, such as the line voltage is interrupted, the power supplied to the load is output from a battery set, where the DC voltage from the battery set is transferred to AC voltage by an inverter first and then supplied to the load. In this battery mode, the second switching unit (20) is switched to link with the third output terminal (O/P-3), and the third switching unit (30) is switched to link with the second output terminal (O/P-2).

Figure 2:
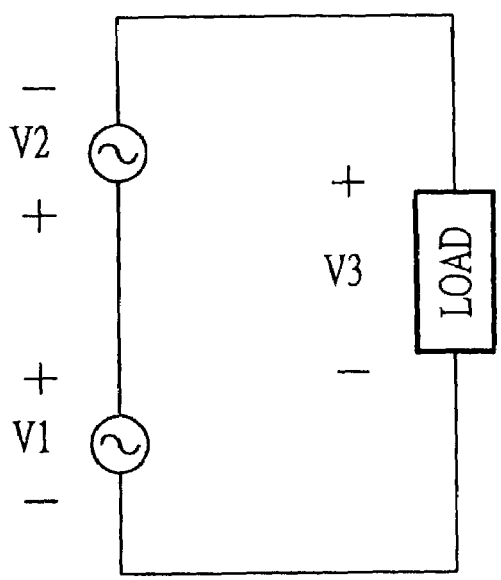
FIG. 2 is a schematic view showing the voltage buck (step down) mode in accordance with the present invention.
Figure 3:
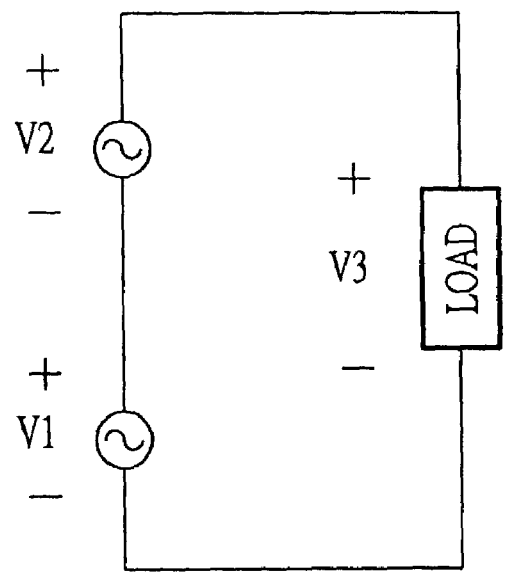
FIG. 3 is a schematic view showing the voltage boost (step up) mode in accordance with the present invention.

With reference to FIGS. 2 and 3, the operation schematic views of the voltage buck (step-down) mode and the voltage boost (step-up) mode are shown. As shown in FIG. 2 of the voltage buck mode, when the line voltage (V1) is higher than a normal value, a desired output voltage (V3) lower than the line voltage (V1) is obtained by means of coupling the line voltage (V1) with a compensation voltage (V2) in series, wherein the phase of the compensation voltage (V2) is reverse to that of the line voltage (V1).

On the contrary, when the line voltage (V1) is lower than a normal value as shown in FIG. 3, a desired output voltage (V3) higher than the line voltage (V1) is obtained by means of coupling the line voltage (V1) with a compensation voltage (V2) with a phase the same as that of the line voltage (V1).

Figure 4:
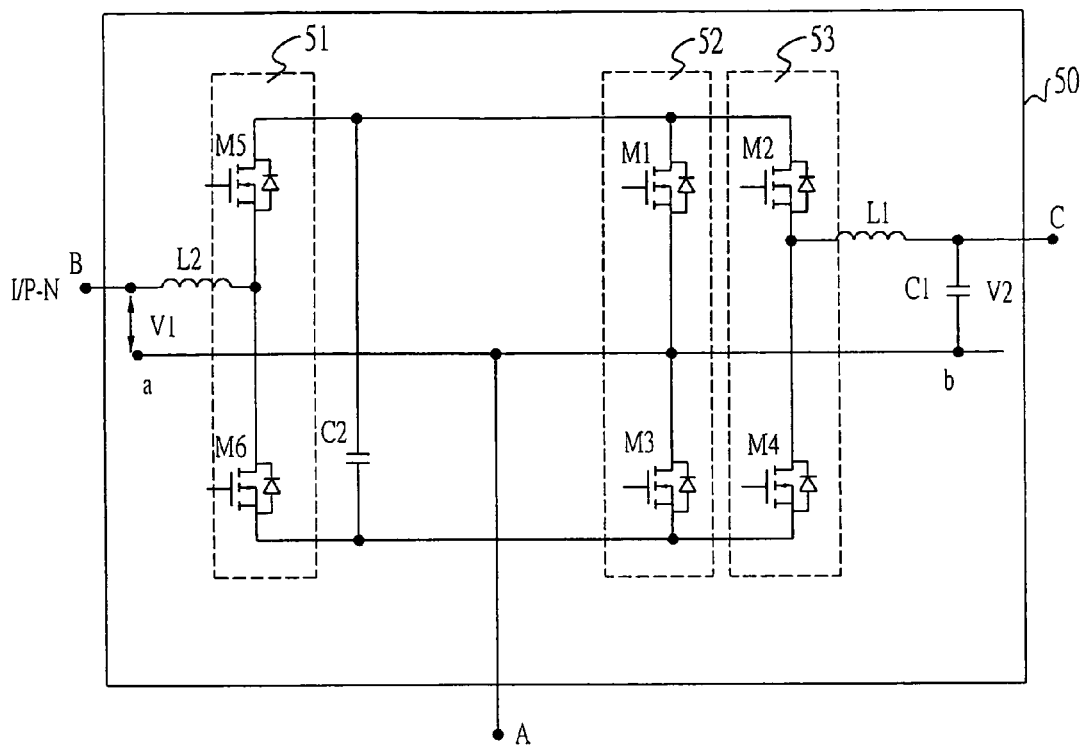
FIG. 4 is a circuit diagram of a first embodiment of an AC/AC power converter in accordance with the present invention.

With reference to FIG. 4, a first embodiment of the AC/AC power converter (50) is composed of three transistor sets (51–53) composed of six transistors (M1–M6), two inductors (L1, L2) and two capacitors (C1, C2). The line voltage is input to the AC/AC power converter (50) through two terminals A and B, and the compensation voltage is output from terminal C. In more detail, the three transistor sets (51–53) are connected in parallel, where the line voltage from terminal B is coupled to a connecting node of the two transistors (M5, M6) of the first transistor set (51) through the first inductor (L1). The other input terminal A of the line voltage is coupled to a connecting node of the two transistors (M1, M3) that form the second transistor set (52). Further, a connecting node of the two transistors (M2, M4) that form the third transistor set (53) is through a second inductor (L1) for linking to the second switching unit (30) (as shown in FIG. 1).

Figure 5:
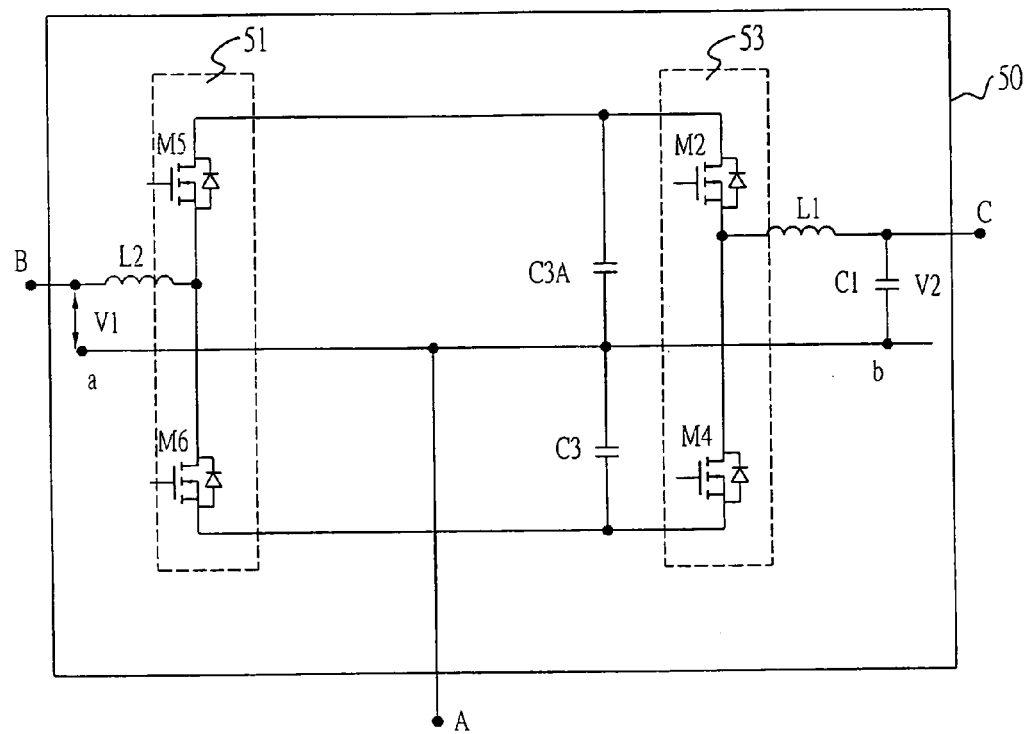
FIG. 5 is a circuit diagram of a second embodiment of an AC/AC power converter in accordance with the present invention.

With reference to FIG. 5, a second embodiment of the AC/AC converter (52) is substantially the same as the first embodiment of FIG. 4, wherein the change is that the second transistor set (52) composed of transistors (M1, M3) is replaced with two capacitors (C3A and C3) that are both connected in series.

Figure 6:
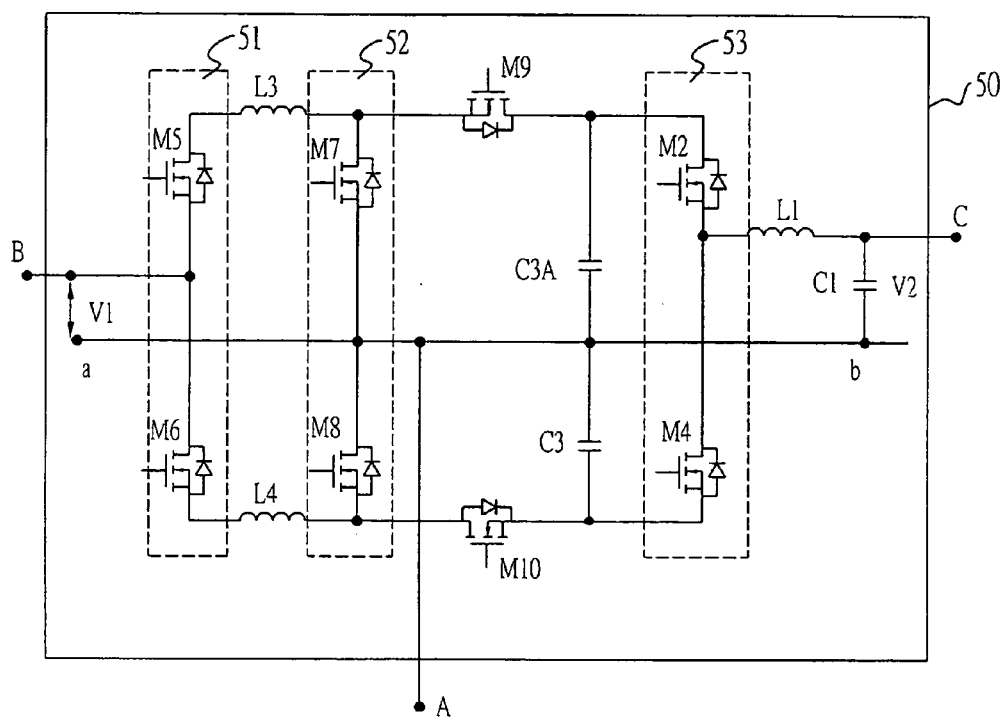
FIG. 6 is a circuit diagram of a third embodiment of an AC/AC power converter in accordance with the present invention.

With reference to FIG. 6, a third embodiment of the AC/AC power converter (50) is modified in accordance with FIG. 5. The inductor (L2) is removed and two inductors (L3 and L4) are connected between the first transistor set (51) and the second transistor set (52) that is composed of transistors (M7, M8). Moreover, two transistors (M9, M10) are coupled between the second transistor set (52) and the capacitors (C3A, C3).

Figure 7:
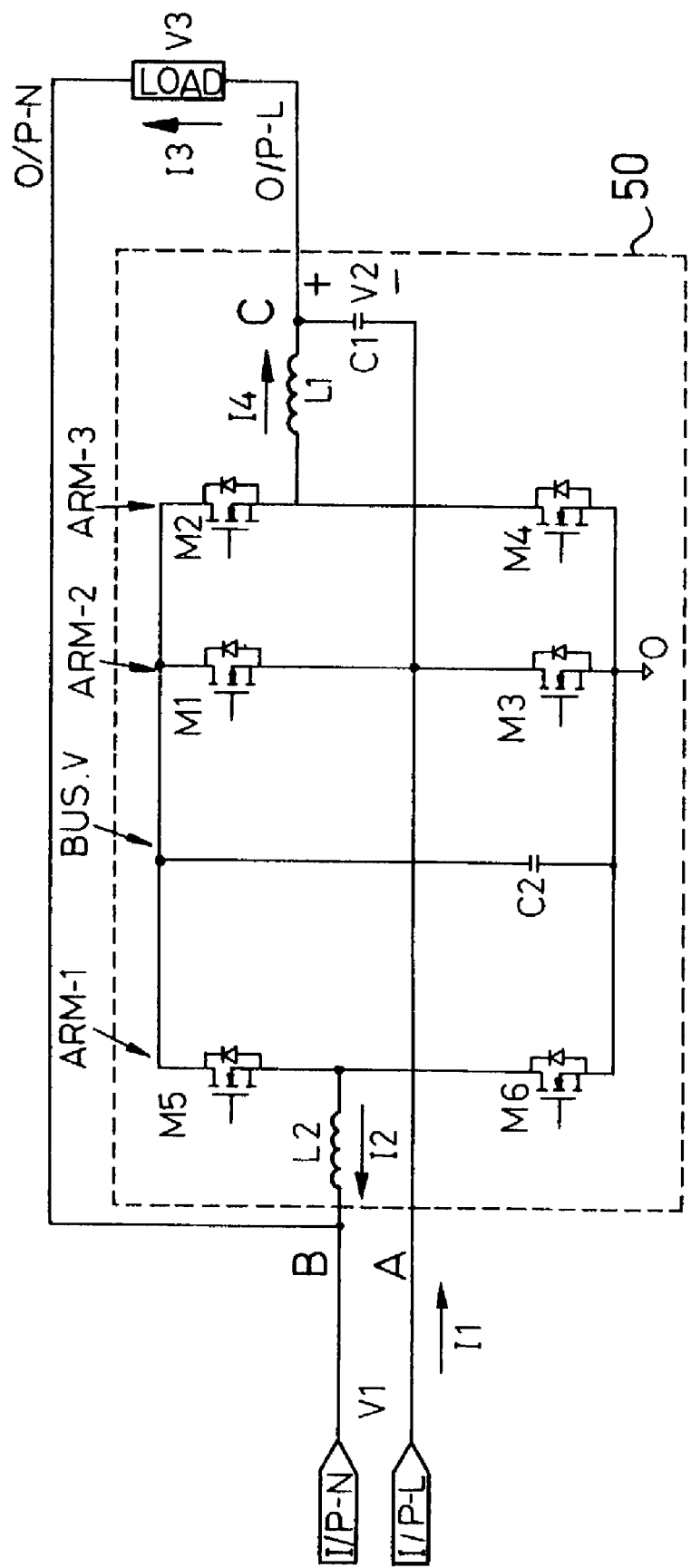
FIG. 7 is an operation view of the AC/AC power converter of FIG. 4.

With reference to FIG. 7, for example, the UPS adopts the first embodiment of the AC/AC power converter (50) of FIG. 4 and is operated in the line voltage conversion mode, wherein V1 represents the line voltage and V2 represents the compensation voltage output from the AC/AC power converter (50). The output voltage for the load is denoted with V3, wherein V3 is the summation of V1 and V2.

For example, whether in the voltage boost mode or voltage buck mode, when the adjustable voltage range of the AC/AC power converter (50) is preset to be 15% of the normal output voltage (i.e. the energy needs to be converted by the AC/AC power converter (50) is 15% of the total output power), and the conversion efficiency of the AC/AC power converter (50) is 90%, the total operation efficiency of the line interactive UPS reaches 98.5%. The calculation formula is:

$$85\% + (15\% \times 0.9) = 98.5\%$$

Figure 8:
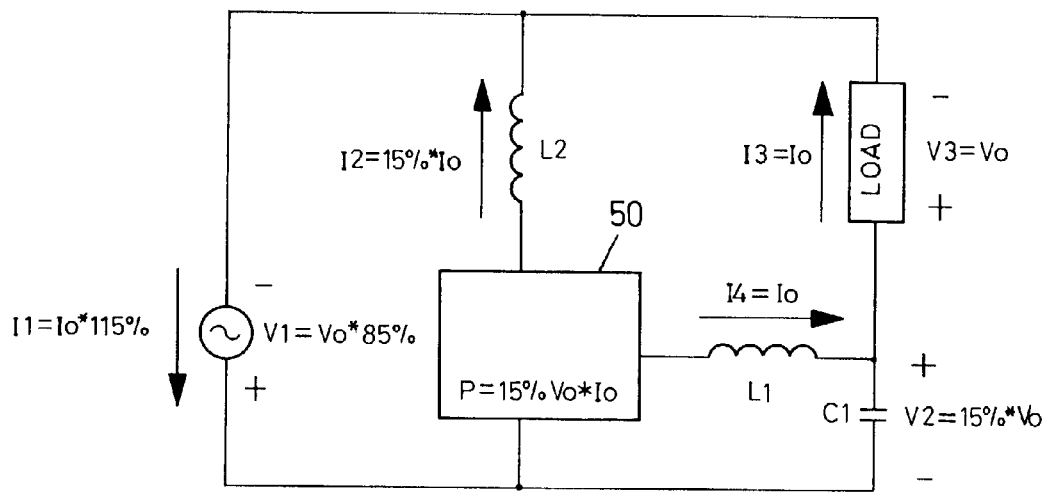
FIG. 8 is a schematic view showing the current and voltage of the line interactive UPS, when the UPS of the present invention is operated in the voltage boost mode.
Figure 10:
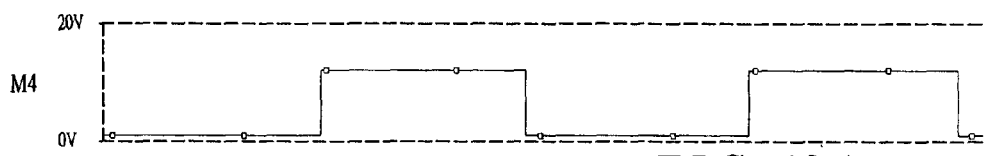
FIG. 10A–10F shows the driving voltage waveforms of each transistor of the AC/AC power converter, when the AC/AC power converter is operated in the boost mode.
FIG. 10G is a voltage waveform of a compensation voltage output from the AC/AC power converter, when the AC/AC power converter is operated in the boost mode.
Figure 10:
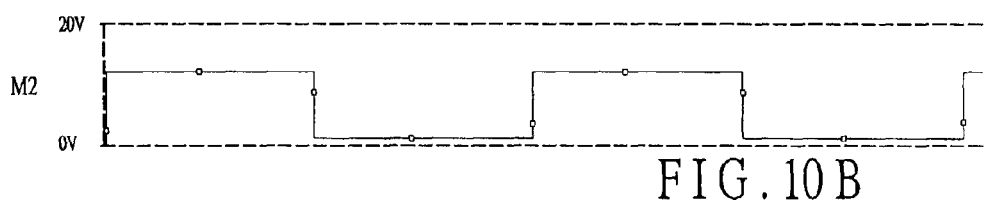
Figure 10:
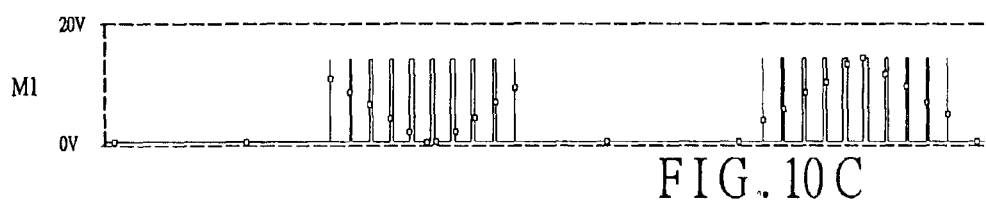
Figure 10:
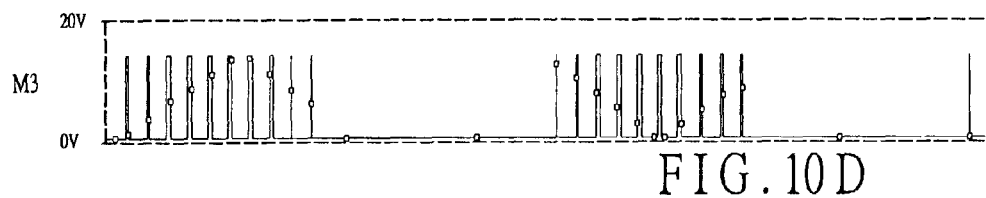
Figure 10:
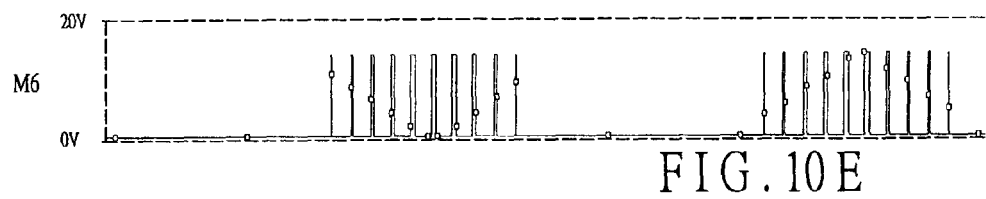
Figure 10:
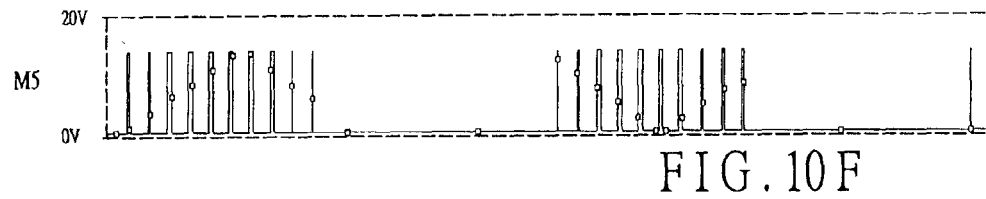
Figure 10:
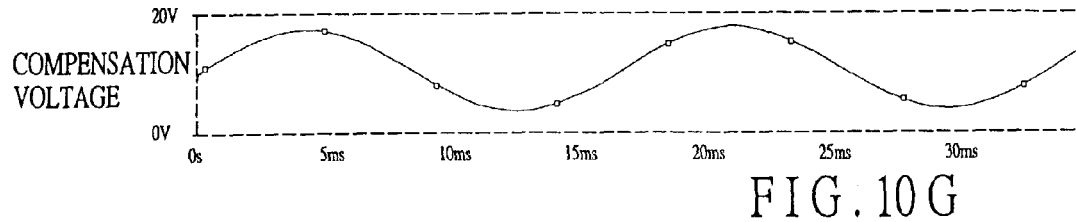
Figure 11:
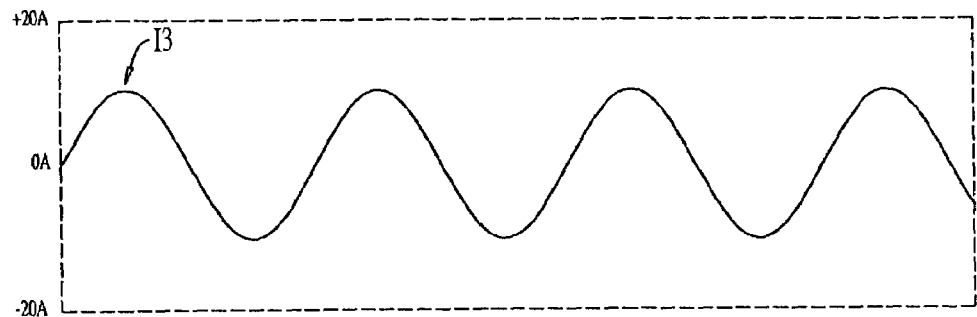
FIGS. 11A–11C show the voltage waveform and current waveform when the AC/AC power converter of FIG. 1 is operated in the boost mode.
Figure 11:
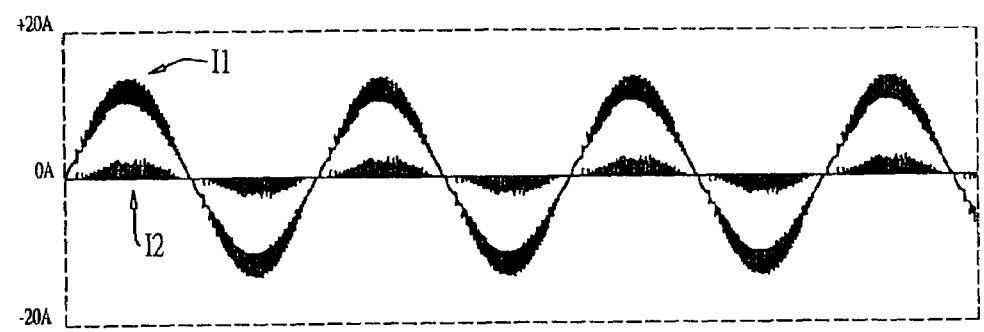
Figure 11:
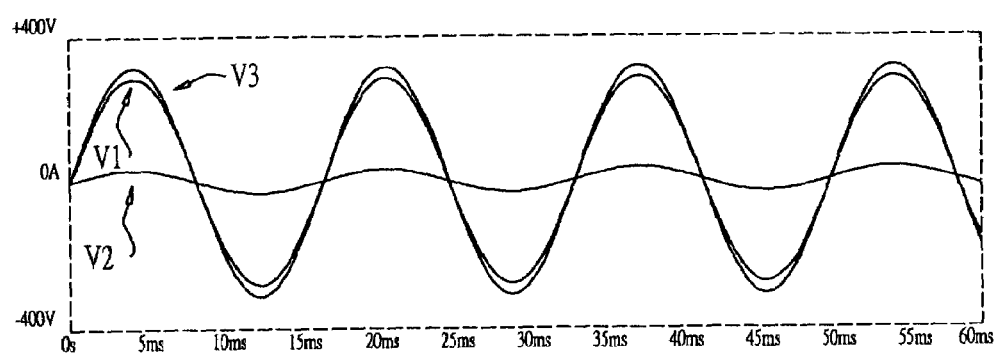

With reference to FIG. 8, in the voltage boost mode, when the line voltage (V1) is only 85% of a normal output value Vo, the compensation voltage (V2) offered by the AC/AC power converter (50) must be 15% of the normal output value Vo, i.e. V2=15%×Vo, wherein the phase of the compensation voltage (V2) is the same as that of the line voltage (V1). Moreover, to obtain the appropriate compensation voltage (V2), the precise activation control of each transistor in the AC/AC power converter (50) is necessary. For example, the driving voltage waveforms for each transistor (M1–M6) of FIG. 1 are illustrated in FIGS. 10A–10F, and the compensation voltage waveform is illustrated in FIG. 10G. The current waveforms of currents I1 and I2 denoted in FIG. 8 are shown in FIGS. 11A–11C, furthermore, the voltage waveforms of voltage V1, V2 and V3 denoted in FIG. 8 are also shown.

Figure 9:
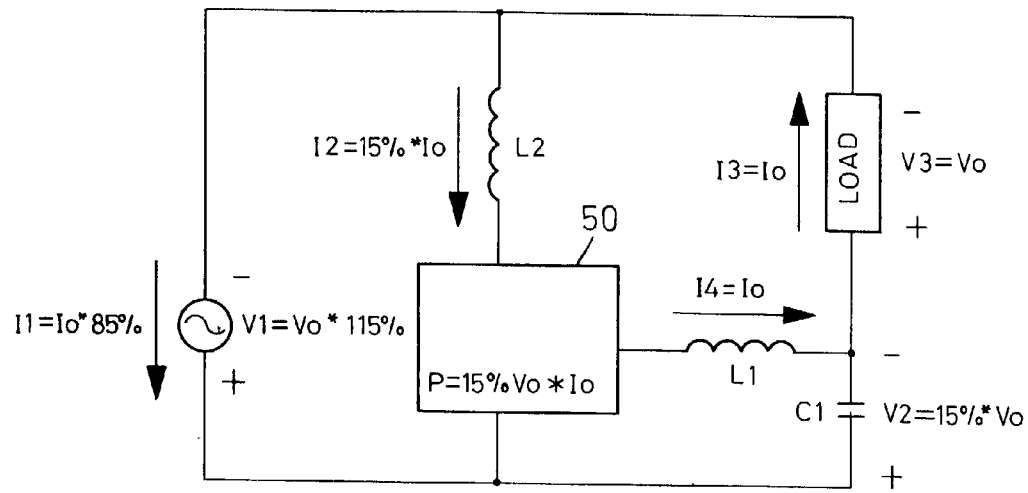
FIG. 9 is a schematic view showing the current and voltage of the line interactive UPS, when the UPS of the present invention is operated in the voltage buck mode.
Figure 12:
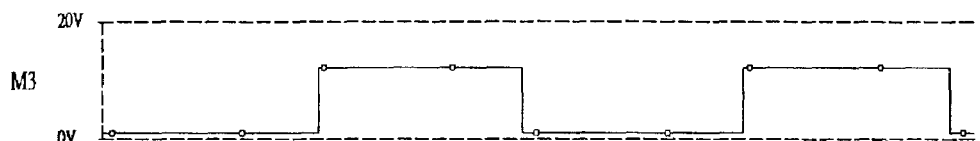
FIG. 12A–12F shows the driving voltage waveforms of each transistor of the AC/AC power converter, when the AC/AC power converter is operated in the buck mode.
FIG. 12G is a voltage waveform of a compensation voltage output from the AC/AC power converter, when the AC/AC power converter is operated in the buck mode.
Figure 12:
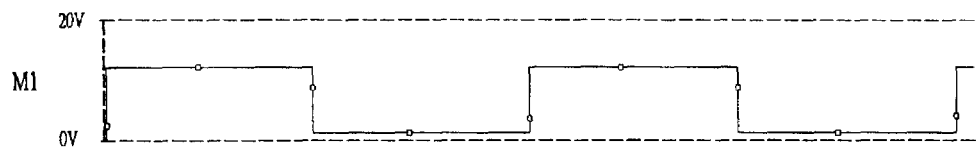
Figure 12:
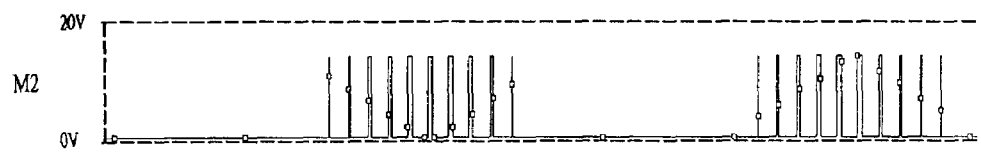
Figure 12:
Figure 12:
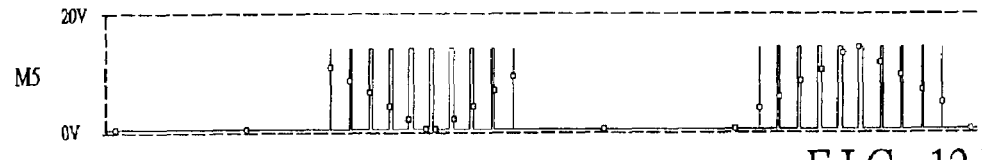
Figure 12:
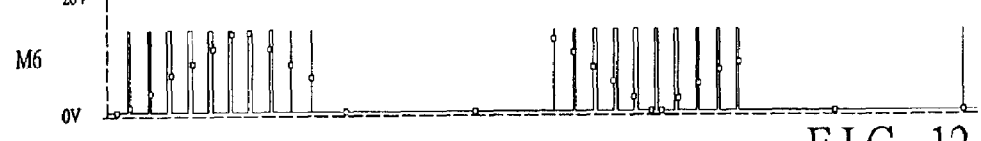
Figure 12:
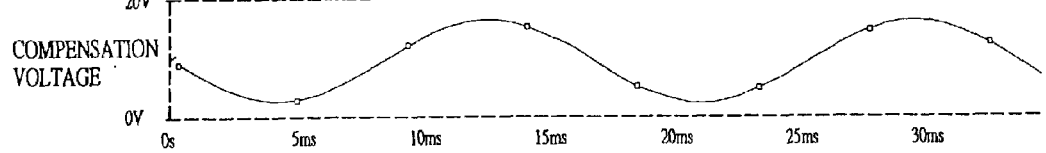
Figure 13:
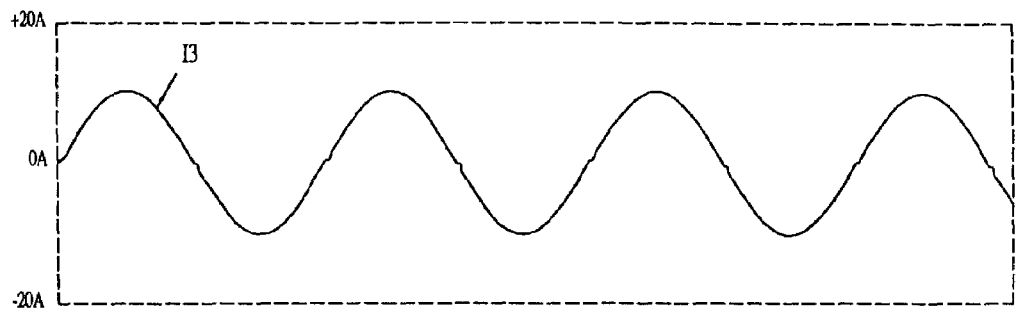
FIGS. 13A–13C show the voltage waveform and current waveform when the AC/AC power converter of FIG. 1 is operated in the buck mode.
Figure 13:
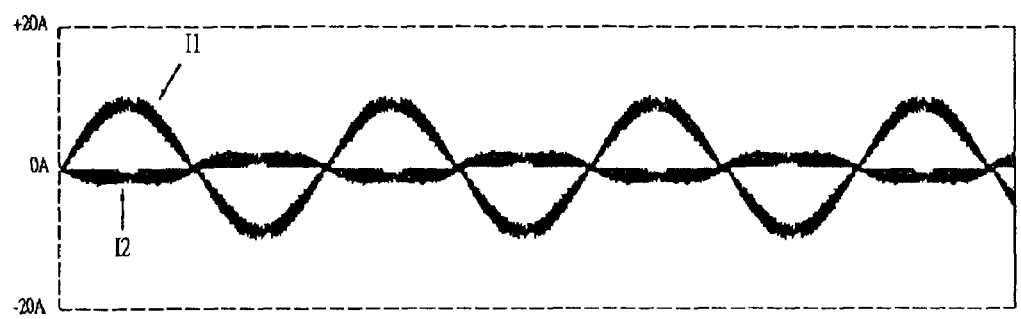
Figure 13:
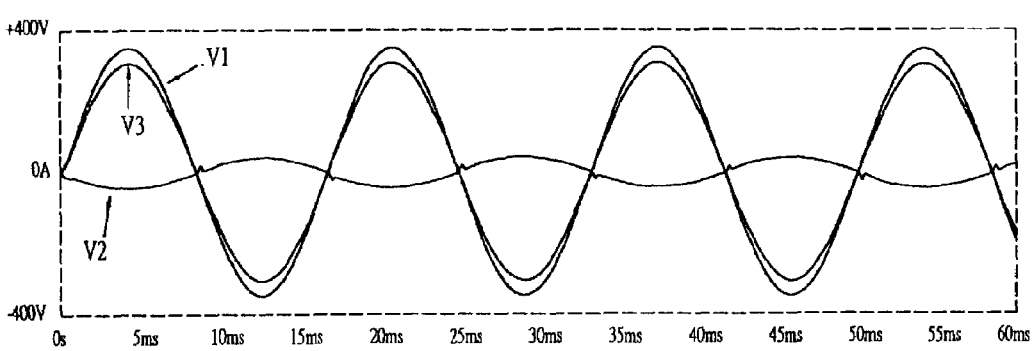

With reference to FIG. 9, in the voltage buck mode, when the line voltage (V1) is 115% of the normal output value Vo, the compensation voltage (V2) offered by the AC/AC power converter (50) is 15% of the normal output value Vo. However, the phase of the compensation voltage (V2) is reverse to that of the line voltage (V1). Therefore, when the compensation voltage (V2) is coupled to the line voltage (V1) in series, the output voltage (V3) supplied to the load is able to maintain at the normal value based on the AC delta control concept. With reference to FIGS. 12A–12F, in the voltage buck mode, the driving voltage waveforms of each transistor (M1–M6) of the AC/AC power converter (50) are shown, wherein FIG. 12G is the waveform of the compensation voltage V3. The current I1, I2 and I3 and the voltage V1, V2 and V3 denoted in FIG. 9 are further correspondingly illustrated in FIGS. 13A–13C. It is noted that in FIG. 13C, the phase of the compensation voltage V2 is reverse to that of the line voltage V1, thus the output voltage V3 for the load is kept at the normal value.

Figure 14:
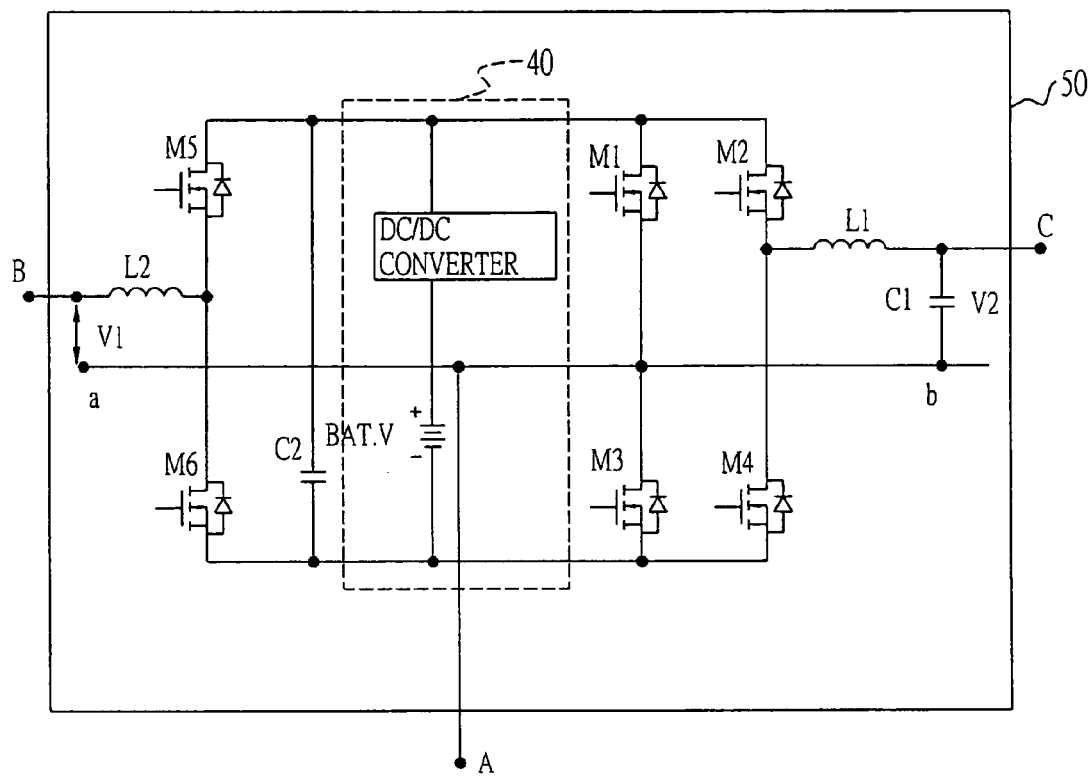
FIG. 14 is a first circuit diagram embodiment showing the AC/AC power converter of FIG. 4 in association with a battery set being together operated in a battery mode.

With reference to FIG. 14, a DC power supply unit (40) in association with the AC/AC power converter (50) of FIG. 4 are together operated in the battery mode. The DC power supply unit (40) is coupled between the first transistor set (51) and the third transistor set (53) in parallel, wherein the DC power supply unit (40) includes at least one DC/DC converter and a battery set.

Figure 15:
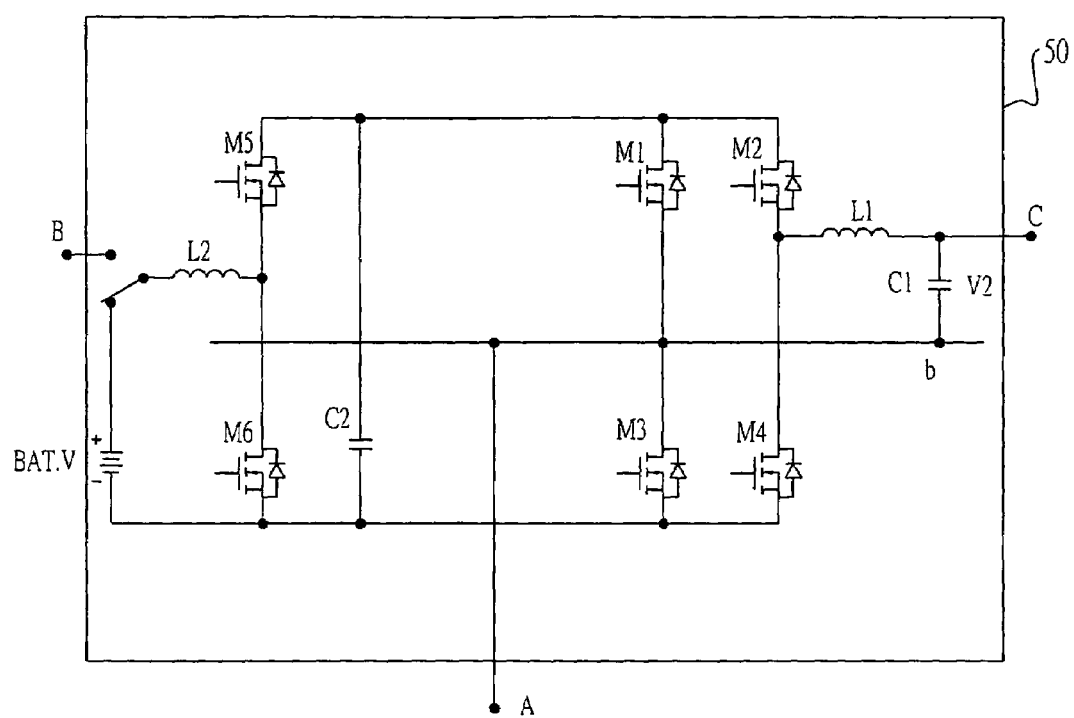
FIG. 15 is a second circuit diagram embodiment showing the AC/AC power converter of FIG. 4 in association with a battery set being together operated in a battery mode.
Figure 16:
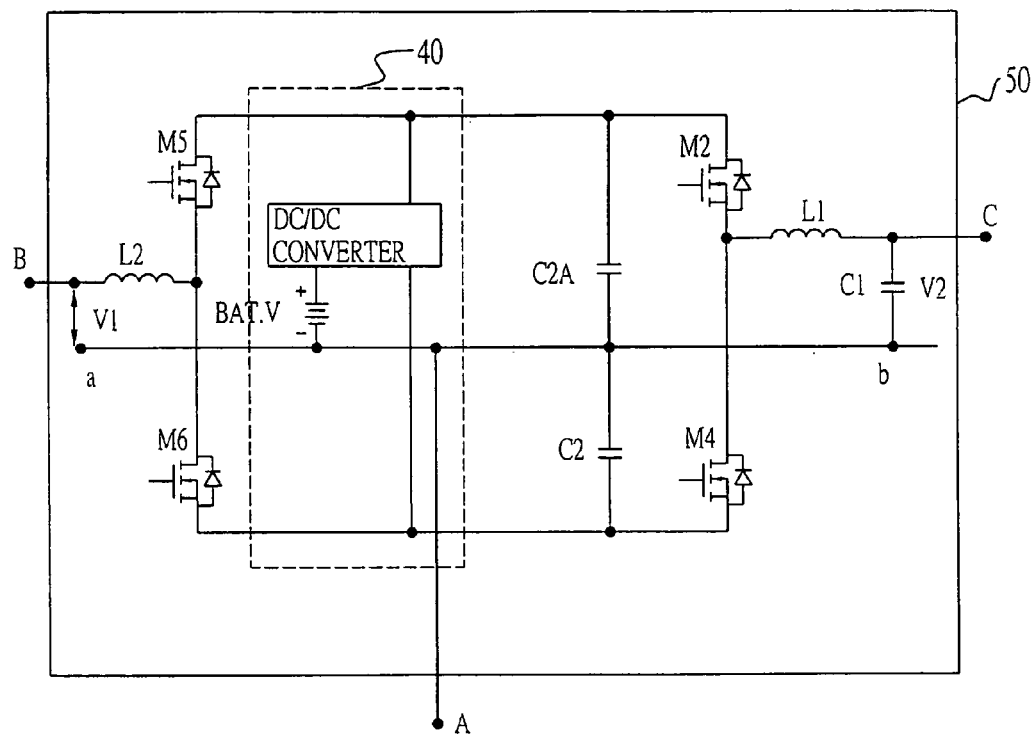
FIG. 16 is first circuit diagram embodiment showing the AC/AC power converter of FIG. 5 in association with a battery set being together operated in a battery mode.

With reference to FIG. 15, another kind of circuit layout to perform the battery mode is shown, wherein a battery set is coupled to the inductor (L2) through a switching element (not numbered). In FIG. 15, the AC/AC power converter (50) is the same as that shown in FIG. 4. With reference to FIG. 16, the battery mode is achieved by the AC/AC power converter (50) of FIG. 5 in association with a DC supply unit (40).

Figure 17:
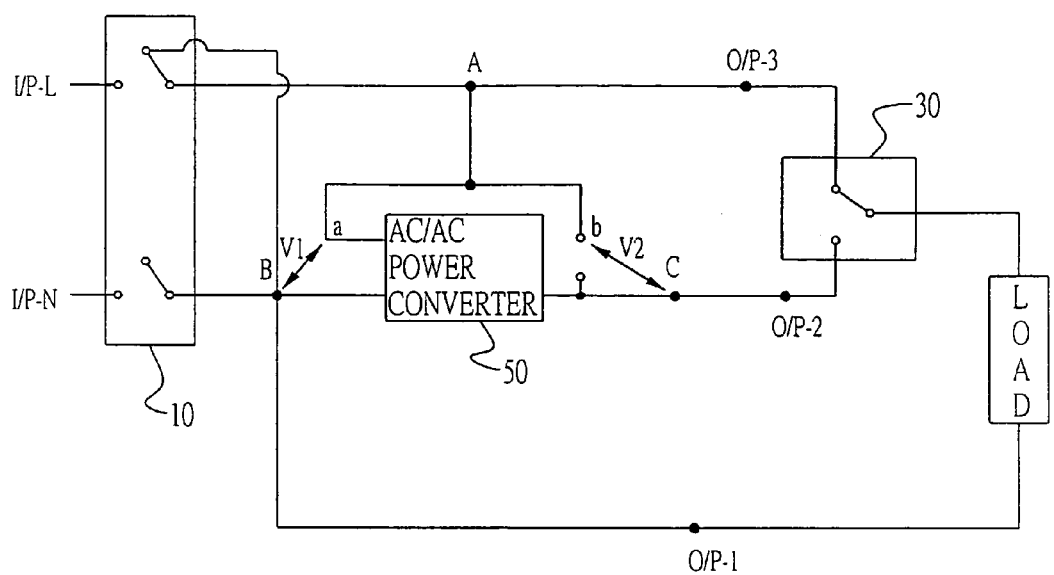
FIG. 17 is a block diagram of a second embodiment of a line interactive UPS in accordance with the present invention.

The characteristic of the present invention is that a bi-directional AC/AC power converter (50) is employed to compensate the line voltage so as to provide a stable voltage. Thus the variation of the circuit layouts may have many types. For example, FIG. 17 is a second embodiment of the line interactive UPS in accordance with the present invention, which is substantially the same as the first embodiment shown in FIG. 1. In FIG. 17, the second switching unit (20) is removed, and only the third switching unit (30) is employed to couple the load between the on-line UPS by appropriately changing the linkage of each output terminal (O/P-1)–(O/P-3). The first output terminal (O/P-1) is linked to one end of the load, and the other end of the load is connected to the third switching unit (30). The by-pass mode is still taken from the two terminals (O/P-1) and (O/P-3), the line voltage conversion mode is taken from (O/P-1) and (O/P-2), and the battery mode is taken from (O/P-2) and (O/P-3), wherein all the output terminal combinations for different modes are the same as the first embodiment.

Figure 18:
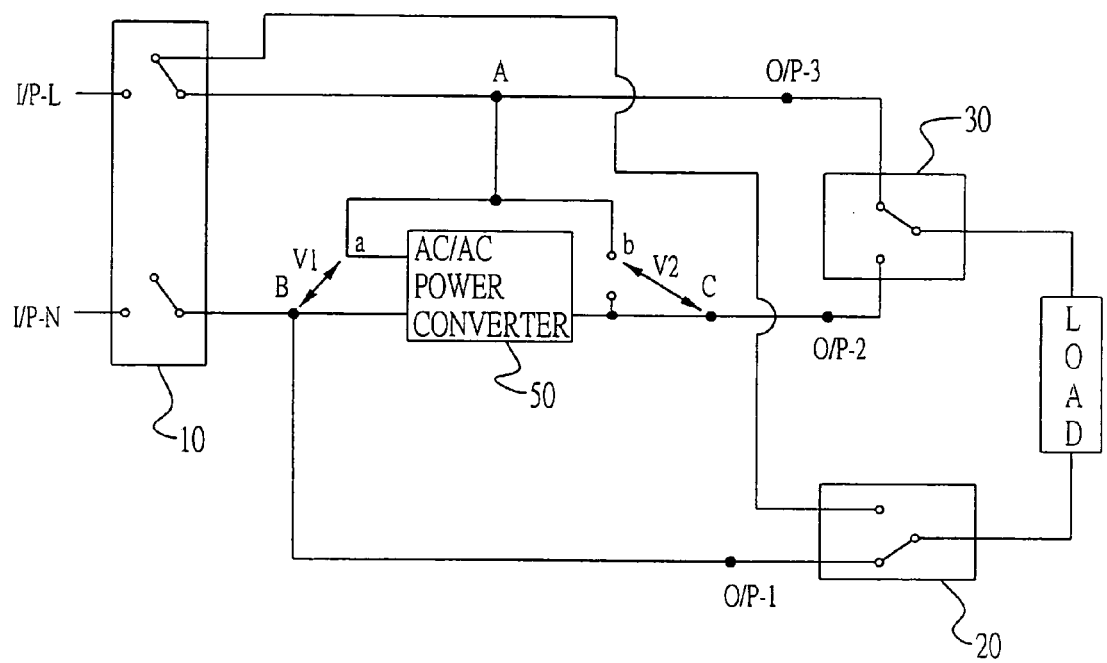
FIG. 18 is a block diagram of a third embodiment of a line interactive UPS in accordance with the present invention.

With reference to FIG. 18, a third embodiment of the present invention is approximately the first embodiment, the modification made to the third embodiment is that the second switching unit (20) is directly connected to first switching unit (10) without through the third switching unit (30).

The invention may be varied in many ways by a skilled person in the art. Such variations are not to be regarded as a departure from the spirit and scope of the invention, and all such modifications are intended to be included within the scope of the following claims.

What is claimed is:

1. A power supply method of a line interactive uninterruptible power supply (UPS) comprising the steps of:
    providing a first switching unit to be coupled between a line voltage and a bi-directional AC/AC converter, wherein the first switching unit has
        a first input terminal and a second input terminal respectively coupled to the line voltage; and
        two output terminals;
    providing a switching means to be couple to the first switching unit, the bi-directional AC/AC converter and a load, wherein the load has two ends;
    determining an operating mode of the line interactive UPS from a by-pass mode, a line voltage conversion mode and a battery mode, based on the stability of a line voltage coupled to the UPS;
    wherein in the by-pass mode, the line voltage is directly coupled to the load when the line voltage is stable;
    wherein in the line voltage conversion mode, the line voltage is further compared with a predetermined normal voltage, if the line voltage is higher than the normal voltage, a compensation voltage with a phase that is opposite to that of the line voltage is coupled to the line voltage in series; wherein if the line voltage is lower than the normal voltage, a compensation voltage with a phase that is the same as that of the line voltage is coupled to the line voltage in series, wherein the compensation voltage is generated by the bi-directional AC/AC power converter;
    wherein in the battery mode, a DC power supply unit of the line interactive UPS provides the load with power.

2. The method as claimed in claim 1, wherein in the line voltage conversion mode, the frequency of the compensation voltage is the same as that of the line voltage.

3. A line interactive uninterruptible power supply (UPS), the UPS comprising:
    a first switching unit with a first input terminal and a second input terminal respectively coupled to a line voltage, wherein the first switching unit has two output terminals;
    a bi-directional AC/AC power converter coupled between the two output terminals of the first switching unit and a switching means, wherein a load with two ends is coupled to the switching means;
    wherein when the line voltage is stable, the line voltage is directly provided to the load through the first switching unit and the switching means;
    wherein when the line voltage is unstable, the bi-directional AC/AC power converter outputs a compensation voltage to couple to the line voltage in series, and then the line voltage coupled to the compensation voltage is further supplied to the load;
    wherein when the line voltage is lower than a normal value, the UPS is operated in a voltage boost mode, and the compensation voltage has a phase that is the same as that of the line voltage; otherwise when the line voltage is higher than the normal value, the UPS is operated in a voltage buck mode and the phase of the compensation voltage is opposite to that of the line voltage.

4. The line interactive UPS as claimed in claim 3, wherein the AC/AC power converter has a first input terminal, a second input terminal and an output terminal, wherein the first input terminal and the second input terminal are coupled respectively to the two output terminals of the first switching unit, and the output terminal is coupled to the switching means.

5. The line interactive UPS as claimed in claim 4, wherein the switching means comprises:
    a second switching unit having two input terminals and an output terminal that is selectively switched to one of the two input terminals thereof, wherein, the two input terminals of the second switching unit are coupled respectively to the two output terminals of the first switching unit, and the output terminal of the second switching unit is connected to the load; and
    a third switching unit has two input terminals and an output terminal that is selectively switched to one of the two input terminals of the third switching unit, wherein the two input terminals of the third switching unit are coupled respectively to the output terminal of the AC/AC power converter and one of two output terminals of the first switching unit, and further the output terminal of the third switching unit is connected to the load.

6. The line interactive UPS as claimed in claim 4, wherein the switching means comprises:
    a second switching unit has two input terminals and an output terminal that is selectively switched to one of the two input terminals of the second switching unit, wherein the two input terminals of the second switching unit are coupled respectively to the output terminal of the AC/AC power converter and one of two output terminals of the first switching unit, and further the output terminal of the third switching unit is connected to one end of the load, wherein the other end of the load is directly coupled to the other one of two output terminals of the first switching unit.

7. The line interactive UPS as claimed in claim 3, wherein the AC/AC power converter comprises:
    a first, a second and a third transistor set connected in parallel, wherein each transistor set is composed of two transistors both connected in series; and
    wherein the two transistors forming the first transistor set are connected in series at a first node that is used as one input terminal of the AC/AC power converter to couple to the line voltage through a first inductor;
    wherein the two transistors forming the second transistor set are connected in series at a second node that is used as the other one input terminal of the AC/AC power converter to couple to the line voltage;
    wherein the two transistors forming the third transistor set are connected in series at a third node that is used as the output terminal of the AC/AC power converter to couple to the line voltage through a second inductor; and a first capacitor coupled to the first transistor set in parallel.

8. The line interactive UPS as claimed in claim 5, wherein the AC/AC power converter comprises:
a first, a second and a third transistor set connected in parallel, wherein each transistor set is composed of two transistors both connected in series; and
wherein the two transistors forming the first transistor set are connected in series at a first node that is used as one input terminal of the AC/AC power converter to couple to the line voltage through a first inductor;
wherein the two transistors forming the second transistor set are connected in series at a second node that is used as the other one input terminal of the AC/AC power converter to couple to the line voltage;
wherein the two transistors forming the third transistor set are connected in series at a third node that is used as the output terminal of the AC/AC power converter to couple to the line voltage through a second inductor; and
a first capacitor coupled to the first transistor set in parallel.

9. The line interactive UPS as claimed in claim 6, wherein the AC/AC power converter comprises:
a first, a second and a third transistor set connected in parallel, wherein each transistor set is composed of two transistors both connected in series; and
wherein the two transistors forming the first transistor set are connected in series at a first node that is used as one input terminal of the AC/AC power converter to couple to the line voltage through a first inductor;
wherein the two transistors forming the second transistor set are connected in series at a second node that is used as the other one input terminal of the AC/AC power converter to couple to the line voltage;
wherein the two transistors forming the third transistor set are connected in series at a third node that is used as the output terminal of the AC/AC power converter to couple to the line voltage through a second inductor; and
a first capacitor coupled to the first transistor set in parallel.

10. The line interactive UPS as claimed in claim 3, wherein the AC/AC power converter comprises:
a first transistor set, a second transistor set and a capacitor set connected in parallel, wherein each transistor set is composed of two transistors both connected in series, and the capacitor set is composed of two capacitors both connected in series;
wherein the two transistors forming the first transistor set are connected in series at a first node that is used as one input terminal of the AC/AC power converter to couple to the line voltage through a first inductor;
wherein the two capacitors forming the capacitor set are connected in series at a second node that is used as the other one input terminal of the AC/AC power converter to couple to the line voltage; and
wherein the two transistors forming the second transistor set are connected in series at a third node that is used as the output terminal of the AC/AC power converter to couple to the line voltage through a second inductor.

11. The line interactive UPS as claimed in claim 5, wherein the AC/AC power converter comprises:
a first transistor set, a second transistor set and a capacitor set connected in parallel, wherein each transistor set is composed of two transistors both connected in series, and the capacitor set is composed of two capacitors both connected in series;
wherein the two transistors forming the first transistor set are connected in series at a first node that is used as one input terminal of the AC/AC power converter to couple to the line voltage through a first inductor;
wherein the two capacitors forming the capacitor set are connected in series at a second node that is used as the other one input terminal of the AC/AC power converter to couple to the line voltage; and
wherein the two transistors forming the second transistor set are connected in series at a third node that is used as the output terminal of the AC/AC power converter to couple to the line voltage through a second inductor.

12. The line interactive UPS as claimed in claim 6, wherein the AC/AC power converter comprises:
a first transistor set, a second transistor set and a capacitor set connected in parallel, wherein each transistor set is composed of two transistors both connected in series, and the capacitor set is composed of two capacitors both connected in series;
wherein the two transistors forming the first transistor set are connected in series at a first node that is used as one input terminal of the AC/AC power converter to couple to the line voltage through a first inductor;
wherein the two capacitors forming the capacitor set are connected in series at a second node that is used as the other one input terminal of the AC/AC power converter to couple to the line voltage; and
wherein the two transistors forming the second transistor set are connected in series at a third node that is used as the output terminal of the AC/AC power converter to couple to the line voltage through a second inductor.

13. The line interactive UPS as claimed in claim 3, wherein the AC/AC power converter comprises:
a first transistor set, a second transistor set, a third transistor set and a capacitor set all connected in parallel, wherein each transistor set is composed of two transistors both connected in series, and the capacitor set is composed of two capacitors both connected in series;
wherein the two transistors forming the first transistor set are connected in series at a first node that is used as one input terminal of the AC/AC power converter to couple to the line voltage;
wherein the two transistors forming the second transistor set are connected in series at a second node that is used as the other one input terminal of the AC/AC power converter to couple to the line voltage;
wherein the two transistors forming the third transistor set are connected in series at a third node that is used as the output terminal of the AC/AC power converter to couple to the line voltage through a first inductor; and
wherein the two capacitors forming the capacitor set are connected in series at a fourth node that is connected to the second node;
a second inductor and a third inductor are provided between the first transistor set and the second transistor; and
two transistors provided between the second transistor set and the capacitor set.

14. The line interactive UPS as claimed in claim 5, wherein the AC/AC power converter comprises:
a first transistor set, a second transistor set, a third transistor set and a capacitor set all connected in parallel, wherein each transistor set is composed of two transistors both are connected in series, and the capacitor set is composed of two capacitors both connected in series;

wherein the two transistors forming the first transistor set are connected in series at a first node that is used as one input terminal of the AC/AC power converter to couple to the line voltage;

wherein the two transistors forming the second transistor set are connected in series at a second node that is used as the other one input terminal of the AC/AC power converter to couple to the line voltage;

wherein the two transistors forming the third transistor set are connected in series at a third node that is used as the output terminal of the AC/AC power converter to couple to the line voltage through a first inductor; and wherein the two capacitors forming the capacitor set are connected in series at a fourth node that is connected to the second node;

a second inductor and a third inductor are provided between the first transistor set and the second transistor; and two transistors provided between the second transistor set and the capacitor set.

15. The line interactive UPS as claimed in claim 6, wherein the AC/AC power converter comprises:

a first transistor set, a second transistor set, a third transistor set and a capacitor set all connected in parallel, wherein each transistor set is composed of two transistors both connected in series, and the capacitor set is composed of two capacitors both connected in series;

wherein the two transistors forming the first transistor set are connected in series at a first node that is used as one input terminal of the AC/AC power converter to couple to the line voltage;

wherein the two transistors forming the second transistor set are connected in series at a second node that is used as the other one input terminal of the AC/AC power converter to couple to the line voltage;

wherein the two transistors forming the third transistor set are connected in series at a third node that is used as the output terminal of the AC/AC power converter to couple to the line voltage through a first inductor; and wherein the two capacitors forming the capacitor set are connected in series at a fourth node that is connected to the second node;

a second inductor and a third inductor are provided between the first transistor set and the second transistor; and two transistors provided between the second transistor set and the capacitor set.

16. The line interactive UPS as claimed in claim 7, wherein a DC supply unit is further coupled to the first capacitor in parallel.

17. The line interactive UPS as claimed in claim 7, wherein a DC supply unit is further provided between the first inductor and one terminal of the first capacitor.

18. The line interactive UPS as claimed in claim 10, wherein a DC supply unit is further coupled to the first transistor set in parallel.

* * * * *